United States Patent [19]
Culver

[11] Patent Number: 5,873,239
[45] Date of Patent: Feb. 23, 1999

[54] NUCLEAR ROCKET ENGINE INCORPORATING A HEAT EXCHANGE

[75] Inventor: Donald W. Culver, Sacramento, Calif.

[73] Assignee: Aerojet General Corporation, Rancho Cordova, Calif.

[21] Appl. No.: 727,868

[22] Filed: Oct. 8, 1996

Related U.S. Application Data

[63] Continuation of Ser. No. 323,183, Oct. 14, 1994, abandoned.

[51] Int. Cl.[6] .................................................. G21D 5/02
[52] U.S. Cl. .......................................... 60/203.1; 376/318
[58] Field of Search ............................... 60/200.1, 203.1; 165/157, DIG. 419, DIG. 427; 376/318, 319

[56] References Cited

U.S. PATENT DOCUMENTS

| | | | |
|---|---|---|---|
| 3,049,870 | 8/1962 | Chamberlain | 60/260 |
| 3,108,054 | 10/1963 | Blackman, Jr. | 60/203.1 |
| 3,158,002 | 11/1964 | Spillmann | 376/318 |
| 3,168,807 | 2/1965 | Ledwith et al. | 60/203.1 |
| 3,286,468 | 11/1966 | Plebuch | 60/203.1 |
| 3,776,344 | 12/1973 | Walsh | 376/318 |
| 3,793,832 | 2/1974 | Moon | 60/203.1 |
| 3,817,029 | 6/1974 | Frisch | 60/203.1 |
| 3,820,325 | 6/1974 | Roman | 60/203.1 |
| 4,147,590 | 4/1979 | Szekely | 376/318 |
| 4,246,751 | 1/1981 | Retallick | 60/203.1 |
| 4,570,703 | 2/1986 | Ringsmuth et al. | 165/DIG. 419 |
| 5,355,945 | 10/1994 | Sanz et al. | 165/157 |
| 5,410,578 | 4/1995 | Walton | 376/318 |
| 5,475,722 | 12/1995 | Culver | 60/203.1 |

FOREIGN PATENT DOCUMENTS 60-0194294  10/1985  Japan ..................................... 165/157

Primary Examiner—Charles G. Freay
Assistant Examiner—Ted Kim
Attorney, Agent, or Firm—Townsend and Townsend and Crew LLP

[57] ABSTRACT

A heat exchanger includes a block having a first group of passages arranged in a generally circular pattern, a second group of passages spaced radially outward from the first group of passages and multiple groups of channels extending generally normal to and fluidly coupling the first and second groups of passages for radial flow therebetween. Selected pairs of passages, each including one passage from each passage group, are adapted for coupling to a first circulation line. The other ones of the passages are adapted for coupling to a second circulation line so that fluid heat from one of the circulation lines can be transferred to fluid from the other one of the lines in the heat exchanger. With this dense flow configuration, a compact heat exchanger can be constructed which, for example, is especially advantageous when used in conjunction with nuclear thermal rocket engines where space is at a premium. The dense fluid flow pattern also reduces material requirements and, thus, advantageously reduces weight. In addition, the passages and channels are distributed to form an essentially uniform distribution of voids. This enhances the uniformity of the heat exchanger density and, thus, improves its efficiency as a gamma shield when used with nuclear systems.

15 Claims, 7 Drawing Sheets

NUCLEAR ROCKET ENGINE INCORPORATING A HEAT EXCHANGE

This is a Continuation of application Ser. No. 08/323,183, filed Oct. 14, 1994 now abandoned, the disclosure of which is incorporated by reference.

BACKGROUND OF THE INVENTION

The invention relates to heat exchangers. More particularly, the invention relates to a heat exchanger having a compact construction, which, for example, is especially suited for applications where space is at a premium, such as in nuclear thermal rocket engines.

Nuclear rockets generally use a solid-fuel element reactor to heat a single liquid propellant. Some of the propellant is first used to cool chamber walls and reflectors before injection into the reactor heating chamber. Gamma shields are generally provided to protect crew members from reactor fluence. However, gamma shields generally add to the weight of the engine which adversely affects launching capabilities. In addition, conventional heat exchangers used in these engines are generally massive and significantly increase the rocket's weight.

SUMMARY OF THE INVENTION

The present invention is directed to a heat exchanger having a compact construction and which, for example, is particularly suited for use in nuclear systems such as a nuclear thermal rocket engine. This goal is accomplished by providing a heat exchanger that includes a block having a first group of passages arranged in a generally circular pattern, a second group of passages spaced radially outward from the first group of passages and multiple groups of channels extending generally normal to and fluidly coupling the first and second groups of passages for radial flow therebetween. Selected pairs of passages, each including one passage from each passage group, are adapted for coupling to a first circulation line. The other ones of the passages are adapted for coupling to a second circulation line so that fluid heat from one of the circulation lines can be transferred to fluid from the other one of the lines in the heat exchanger. With this flow configuration, a compact heat exchanger can be constructed which, for example, is especially advantageous when used in applications where space is at a premium such as in nuclear thermal rocket engines. The thickness of the heat exchanger block also can be reduced, thereby further reducing size, due to improved heat transfer efficiencies with this configuration. In addition, the reduced thickness facilitates heat exchanger weight reduction which is especially important when used, for example, as part of a nuclear engine on a space vehicle.

According to another advantageous aspect of the invention, the channels preferably are arranged to facilitate counter-flow between adjacent channels in the vertical or axial direction to enhance heat transfer. In this manner, heat exchange efficiency is enhanced.

According to a further aspect of the invention, the passages and channels preferably are distributed to form an essentially uniform distribution of voids therebetween. This provides the heat exchanger block with an essentially uniform density which is especially advantageous when the heat exchanger is integrated into a nuclear system as a gamma shield in accordance with the present invention. In that case, the heat exchanger material must be suitable for attenuating gamma radiation. When integrated into a nuclear system, the heat exchanger preferably comprises nickel alloy. The channels preferably are configured to maintain a substantially constant distance between adjacent channels in the circumferential direction to enhance the uniformity of the void distribution in the heat exchanger. In the preferred embodiment, the channels are configured to form involute spiral paths to maintain an essentially or substantially constant distance between adjacent channels in the circumferential direction. In addition, the passages in each group are preferably uniformly spaced from one another and are arranged to extend axially and spirally in the circumferential direction. This configuration both advantageously enhances the uniformity of the heat exchanger density in the flow regions.

The heat exchanger of the present invention also performs well as a gamma shield because it is cooled. Since gamma shields intercept radiated energy, they must be well cooled, and the heat exchanger type gamma shield described herein is inherently cooled by heat exchanger fluid flows. In addition, since gamma shields are necessary on nuclear thermal rocket engines, integration with an efficient heat exchange function also reduces engine weight by eliminating some or all of the heat exchanger weight, so that the heat exchanger may be used and carried to its advantage without compromise.

Another advantageous feature of the invention is the radial spacing between the passage groups. The second group of passages, which are spaced radially outward from the first group, are used for the hot gas inlets or outlets depending on the application. The large diameter of the pattern formed by the second group relative to that of first group facilitates more space for manifolding hot, low density fluid. The cooler, lower density fluids require less manifolding space and, thus, preferably are discharged from or introduced into the first group of passages depending on the application.

In the preferred embodiment the heat exchanger comprises a plurality of plate-like members, each having a first group of generally circumferentially spaced holes and a second group of holes radially spaced from the first group of holes. Each channel extends between a first and second group hole pair. The plate-like members are stacked together to form the heat exchanger block such that the holes form the first and second groups of passages. This plate-like member construction facilitates precision cutting of complex flow passage patterns, thereby facilitating formation of very dense patterns which improve heat transfer characteristics. In addition, the plate-like members preferably are circular in configuration to provide a compact block when stacked and to form disc-shaped gamma shield that optimally shields substantially round vehicle. Also, the circular configuration integrates well with reactors having a circular transverse section.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
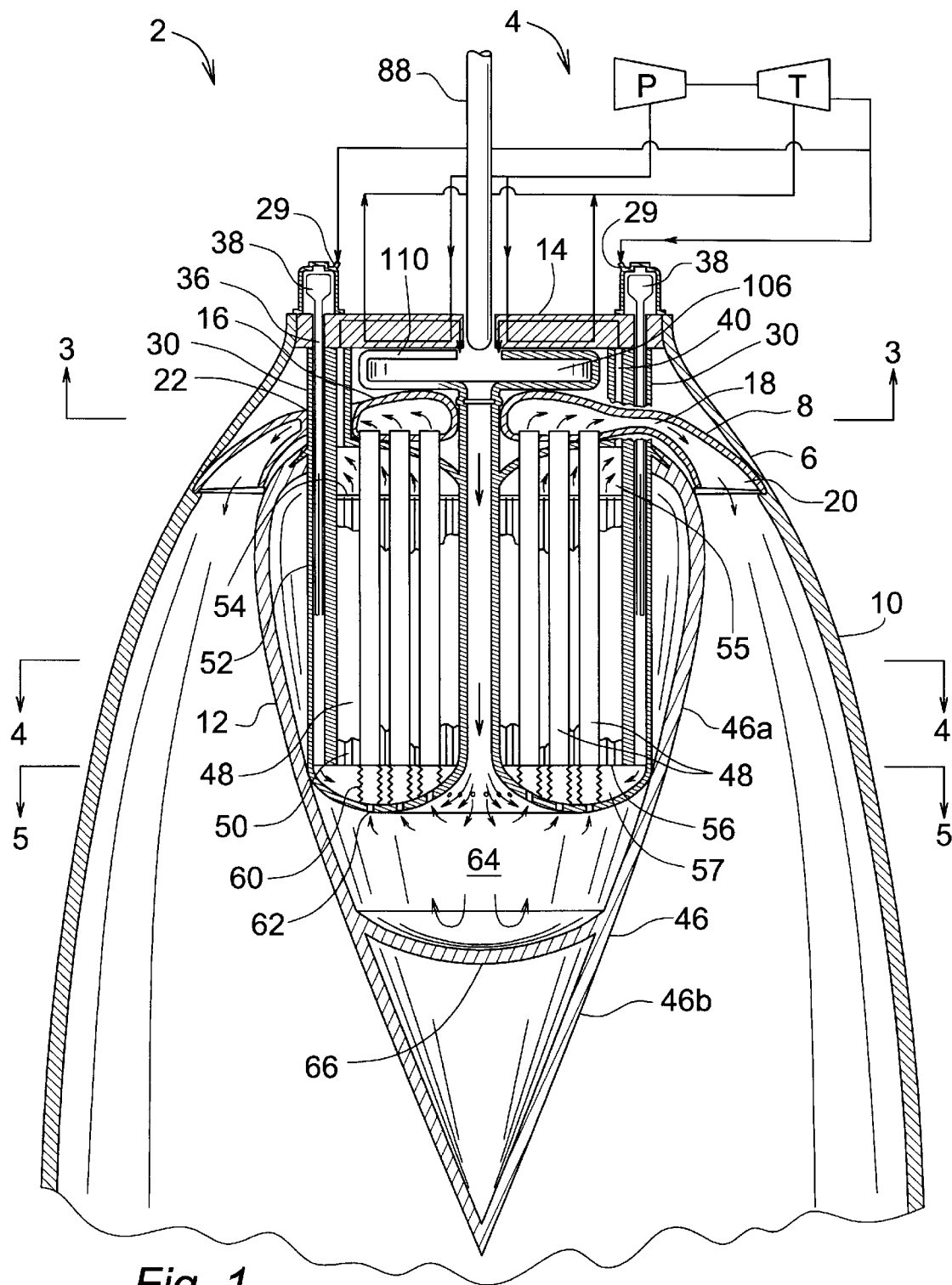
FIG. 1 is a sectional view of a nuclear thermal rocket engine constructed according to the principles of the present invention with the feed system diagrammatically illustrated in simplified form.

Referring to the drawings in detail, wherein like numerals indicate like elements, a heat exchanger 14 is shown in accordance with the principles of the present invention. Although the heat exchanger of the present invention can be used in other applications, it is shown and described as part of a nuclear thermal rocket engine.

Referring to FIG. 1, nuclear thermal rocket engine 2 generally includes a primary feed system 4, a nozzle assembly 6, which generally includes a nozzle block or support member 8 and nozzle extension 10, a reactor 12, which is positioned or housed in nozzle assembly 6, and a heat exchanger or recuperator 14. Feed system 4 generally includes a pump P and turbine T for circulating rocket propellant, preferably liquid hydrogen, through recuperator 14 and reactor 12 before the propellant is accelerated through the throats of nozzle assembly 6 as will be described in more detail below. Although a single pump and turbine is shown in FIG. 1, it should be understood that this is done for simplification. In the preferred embodiment, multiple pumps and turbines are used as shown in the flow diagram illustrated in FIG. 11.

Figure 3:
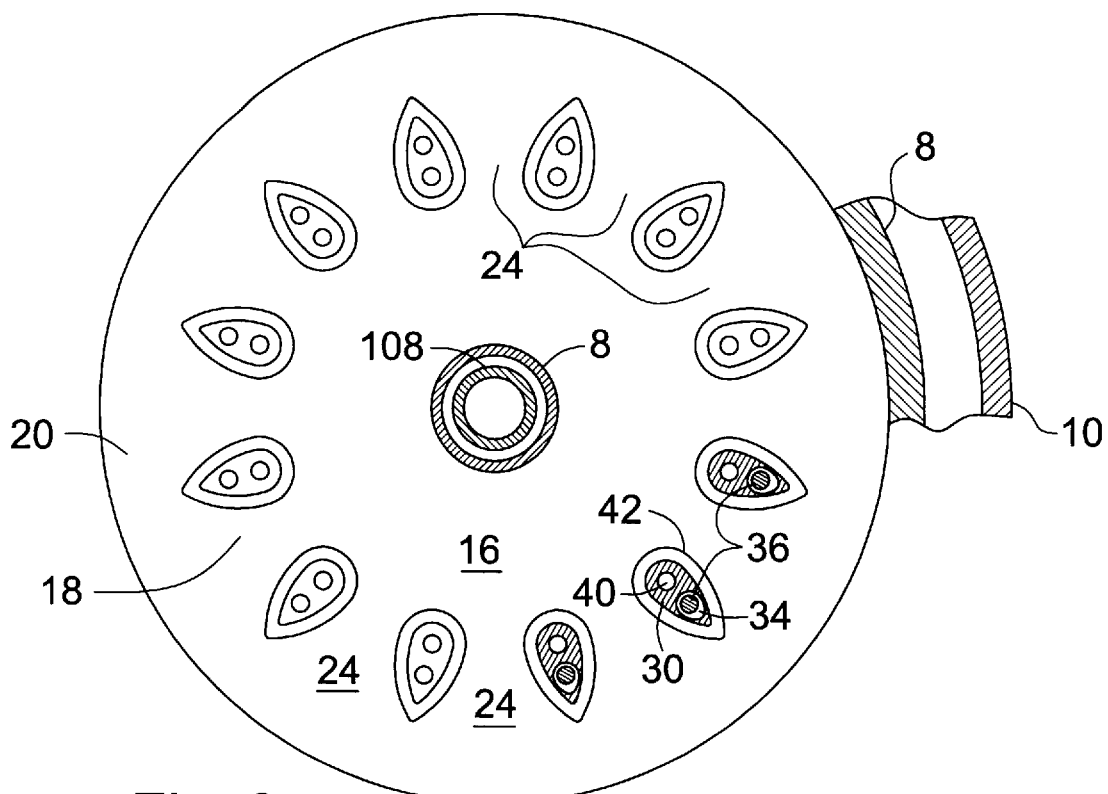
FIG. 3 is a sectional view of the nozzle assembly taken along line 3—3 in FIG. 1 showing the struts in transverse section.

Referring to FIG. 1, nozzle assembly 6 includes nozzle block or support member 8 which is positioned within nozzle extension 10. Nozzle block 8 is constructed to form a gamma shield and, thus, preferably is tungsten alloy. Nozzle block 8 includes a central plenum or subsonic portion 16, nozzle throat or sonic portion 18 and propellant exhaust or supersonic portion 20. Portions 16 and 20 preferably are generally annular as shown in the drawings so that propellant can be exhausted uniformly within nozzle extension 10. Nozzle extension 10 has an expansion deflection (ED) nozzle configuration and diverges in a direction away from nozzle block 8 and preferably is carbon material coated with a hydrogen-resistant material such as a silicide. Nozzle throat portion 18, which is positioned between the converging upstream portion of plenum portion 16 and the diverging downstream portion of exhaust portion 20, has a plurality of circumferentially spaced axial holes 22 formed therethrough for receiving struts 30. Struts 30 divide nozzle throat portion 18 into a plurality of nozzle throats 24 as illustrated in FIG. 3 wherein only 3 of the 12 struts are shown in detail for purposes of simplification. The section of the nozzle block shown in FIG. 1 is staggered to show one of the throats between adjacent struts to the right and a longitudinal section of a strut to the left.

Figure 2:
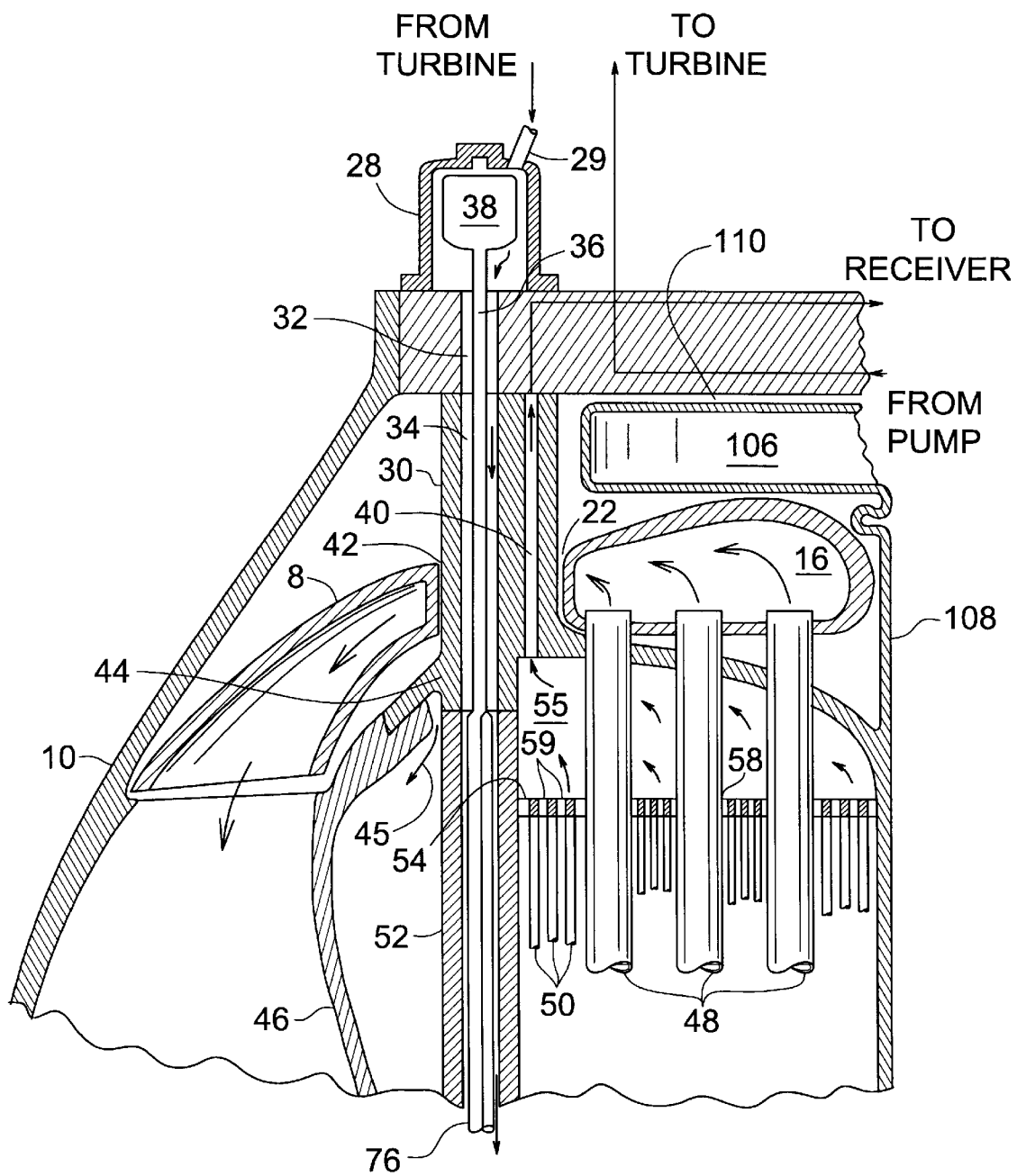
FIG. 2 is an enlarged view of the upper left portion of the engine of FIG. 1.
Figure 6:
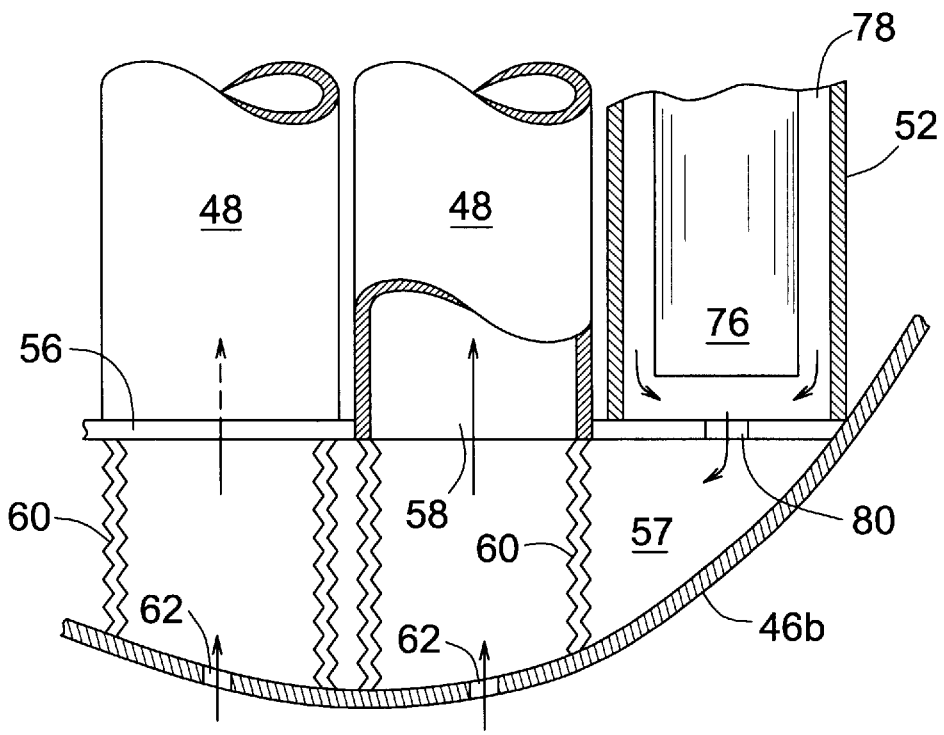
FIG. 6 is an enlarged view of the lower right portion of the reactor of FIG. 1.

Referring to FIGS. 1–3, each strut 30, which preferably is a high nickel alloy to best withstand structural damage generally caused by nuclear fluence, includes a central opening or channel 34 that extends through the entire axial dimension of the strut. Each opening or channel 34 has an inlet fluidly coupled to manifold 28, which is preferably annular, via one of a plurality of circumferentially spaced axial passageways 32 formed through recuperator 14 and an outlet fluidly coupled to the interior of reactor 12, as shown in FIGS. 1 and 6 via reflector assembly 52. Each channel 34 also is configured to receive a control drum shaft 36 which has one end coupled to a drive or motor 38, which is housed in manifold 28, and another end coupled to a control drum that is rotatably mounted in the reflector assembly as will be described in more detail below. Channel 34 is sized to have a transverse dimension substantially larger than that of control drum shaft 36 to form an annular flow channel therebetween. Each strut 30 also includes axial channel 40 that extends therethrough. Channels 40 fluidly couple the reactor core to recuperator inlets to return the gaseous propellant to recuperator 14 as will be described in more detail below. Struts 30 also can be provided with radially extending channels 44 so that relatively cool fluid can be discharged toward the inner wall surface of reactor vessel 46, as shown with arrow 45 in FIG. 2, to facilitate cooling the vessel.

A shroud 42 is positioned around each strut 30, preferably along the entire inner axial dimension of the nozzle block, and spaced from the strut to prevent the hot propellant gases from contacting strut 30. Otherwise the lower temperature propellant flow in struts 30 could draw heat from the hot gases passing through nozzle throats 24, which can result in propellant-specific impulse drops, which, in turn, reduce system efficiency when propellant mass and volume reductions are at a premium. Each shroud is configured to have a shape essentially corresponding to that of a respective strut and to provide sufficient space therebetween, to facilitate radiation cooling of the shroud and maintain its operating temperature at about 2700°–2800° K. The particular dimensions depend on engine size. According to the preferred embodiment, the shroud is tungsten alloy and the strut is nickel alloy to optimize thermal nuclear shielding and structural requirements. For example, the nickel alloy provides excellent heat transfer and structural integrity, which is important since the struts attach the reactor to the vehicle, preferably by way of the recuperator. The tungsten is suited for the high temperature environment in the nozzle throat region. Preferably, the strut and shroud transverse configurations also are teardrop shaped as shown in FIG. 3 to enhance aerodynamic characteristics.

Figure 4:
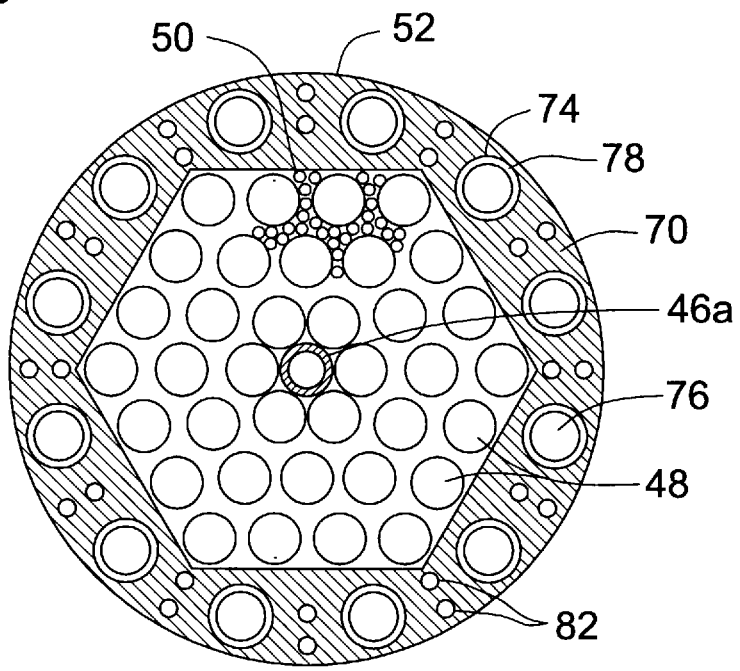
FIG. 4 is a sectional view of the reactor taken along line 4—4 in FIG. 1.

Referring to FIGS. 1, 2 and 4, nozzle assembly 6 houses reactor 12, which generally includes fuel assemblies or rods 48 and moderator rods 50 disposed therebetween as is conventional in the art. The fuel assemblies and moderator rods, both of which can be of conventional construction, are surrounded by reflector assembly 52, which, in turn, is encased in the upper portion 46a of reactor vessel 46. In the preferred embodiment, upper portion 46a is toroidal and lower portion 46b is conical and tapers in the downstream direction to enhance the aerodynamic characteristics of reactor vessel 46 around which exhaust gas flows.

Figure 5:
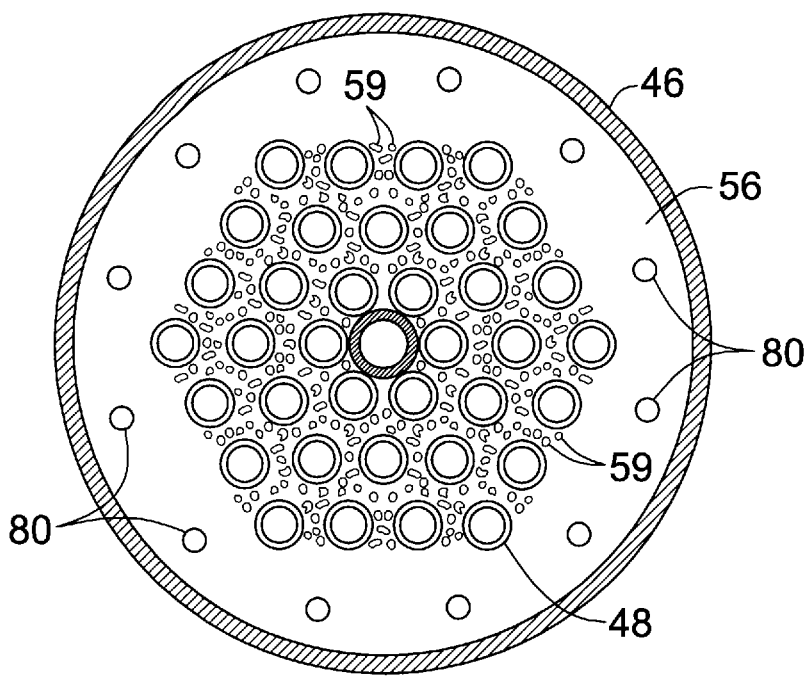
FIG. 5 is a sectional view of the reactor taken along line 5—5 in FIG. 1 showing the upper surface of the lower support plate.

Upper and lower support plates 54 and 56 are provided above and below moderator rods 50 to form a boundary between the reactor core and upper and lower reactor plenums 55 and 57. Each support plate includes a plurality of through holes 58 (see, e.g., FIGS. 2 and 6) for receiving fuel assemblies 48 and a plurality of apertures 59 (see, e.g., FIGS. 2 and 5) between holes 58 to facilitate fluid flow from lower plenum 57 to upper plenum 55 through the spaces between moderator rods 50. Upper plenum 55 is fluidly coupled to strut channels 40, while lower plenum 57 is fluidly coupled to strut channels 34 through reflector assembly 52.

Referring to FIG. 2, the downstream end portions of fuel assemblies 48 pass through holes 58 in the upper plate 54 and holes formed in the upper portion of reactor vessel 46 and the lower portion of nozzle plenum 16 so that the fuel assembly outlets are fluidly coupled with nozzle throats 24. In order to secure the reactor core in position, the downstream portions of fuel assemblies 48 are fixedly secured to the upper portion of reactor vessel 46 by welding, for example. The nozzle block and upper plate 54 are secured in place also by fixedly securing these elements to the downstream portions of fuel assemblies 48 (see, e.g., FIG. 2), for example by welding. In sum, the upper portion of vessel 46 supports the fuel assemblies, which, in turn, support the nozzle block and upper plate 54.

The nozzle block, the fuel assembly support, which comprises the upper portion of reactor vessel 46 that extends between the nozzle block and the reactor, and the recuperator all form portions of the gamma shield, a heavy and necessary part of the rocket engine. In this manner, gamma shield mass is integrated into the nozzle block, fuel assembly support and recuperator, thereby reducing or eliminating the weight impact of these elements on the rocket engine. In the preferred embodiment, these elements are positioned between the aft end of the space vehicle to which the engine is attached and the reactor core, and are constructed from material that attenuates gamma rays.

Referring to FIG. 6, the upstream end portions of fuel assemblies 48 are slidably received in holes 58 of lower plate 56. A plurality of generally cylindrical members 60 also are provided between the outer surface of support plate 56 and the toroidal portion of reactor vessel 46, as shown in FIGS. 1 and 6, to provide discrete fluid flow passages. More specifically, each cylindrical member 60 has an upper end secured to a respective fuel assembly. The other end of each cylindrical member 60 is secured to the toroidal portion 46a of the reactor vessel. A plurality of through holes 62 are provided in the reactor vessel to fluidly couple the interior of each cylindrical member 60 with lowermost plenum 64 which is bounded at its lower portion by curved, disc-shaped wall 66. Cylindrical members 60 preferably have a bellows construction to compensate for axial thermal expansion of fuel assemblies 48.

Referring to FIG. 4, reflector assembly 52 generally includes neutron reflector block 70, which can comprise a single block or plurality of smaller blocks of neutron reflecting material such as beryllium, and a plurality of control drums 76. Each control drum 76 is rotatably mounted within a cylindrical passage 74 formed in reflector block 70 and is coupled to a control drum shaft 36 as is conventional in the art. Each cylindrical passage 74 is configured so that an annular channel 78 is formed between the outer surface of a respective drum and reflector block 70. Referring to FIG. 1, reflector block 70 is arranged such that each central opening 34 formed in a respective strut 30 is aligned with a respective annular channel 78 in which a respective control drum 76 is positioned. Each control drum 76 includes a neutron-absorbing side and a neutron reflecting side to facilitate control of the reactor power as is conventional. Accordingly, one side of the control drum can be boron carbide and the other side beryllium. Thus, when the control drum is rotated so that the boron carbide side faces the reactor core, the reactor power is lowered.

Referring to FIG. 6, a plurality of holes 80 are provided through support plate 56 to fluidly couple each annular channel 78 with lower plenum 57. A plurality of coolant holes 82 (FIG. 4) also can be provided in block 70 to facilitate uniform cooling of the block. In this case, the gaseous propellant or coolant being delivered to the control drums via strut channels 34, as will be discussed in more detail below, can be manifolded or channeled to flow through coolant holes 82 as well as channels 78. Additional holes also would be provided in support plate 56 to fluidly couple coolant holes 82 with lower plenum 57.

Referring to FIGS. 7–10, recuperator or heat exchanger 14 also forms a portion of the gamma shield. Recuperator 14 includes an essentially uniform and dense array of generally radially extending channels and generally axially extending passages to maximize heat transfer in a very compact mass and provide uniform gamma shielding characteristics. In order to accommodate the dense array of numerous channels and passages, platelet technology preferably is used to construct recuperator 14. Platelet technology facilitates manufacture of structural components where thin walls with minute and precisely engineered flow passages in complex patterns or thin walls with complex internal supporting structure are needed. In the preferred embodiment, recuperator 14 generally comprises a stack of bonded platelets. The stack of platelets that forms the recuperator is formed by fusing adjacent platelets. The flow passages and channels are formed by through-passages or surface recesses in the individual platelets, with the passages or recesses in adjacent platelets superimposed to achieve the desired network or flow path through the stack. These passages or recesses can be formed in a variety of ways, one of the most prominent of which is photo etching. Etching to form through-passages which penetrate the thickness of a platelet is commonly termed "through etching," while etching to form a recess in one side of the platelet without fully penetrating the platelet is commonly termed "depth etching." Suitable etching techniques are disclosed in U.S. Pat. No. 3,413,704, which is hereby incorporated herein by reference.

The fusing of the plates together in the stack is accomplished in any of a variety of ways. Examples are diffusion bonding and furnace brazing. Diffusion bonding is a particularly effective method, which involves hot-pressing the platelets together using pressures typically in the range of 6.9 to 20.7 MPa (1,000 to 3,000 psi) at temperatures typically in the range of 455°–540° C. Although the heat exchanger is described herein as comprising a plurality of the platelets to illustrate the preferred embodiment, the platelet description is not intended to limit the scope of the invention. The array of channels and passages can be formed using other techniques that would be apparent to one of skill.

Figure 9:
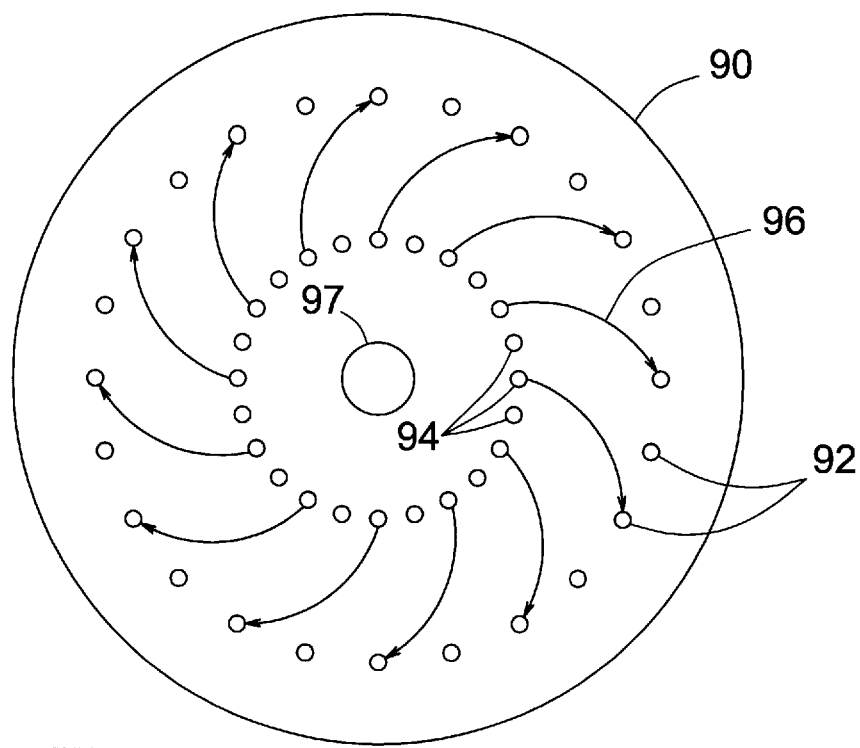
FIG. 9 is a top view of one of the heat exchanger plates, a plurality of which are stacked together to form the heat exchanger of FIG. 1, diagrammatically showing the flow channels which are formed therein and provide a radially outward involute flow pattern.
Figure 10:
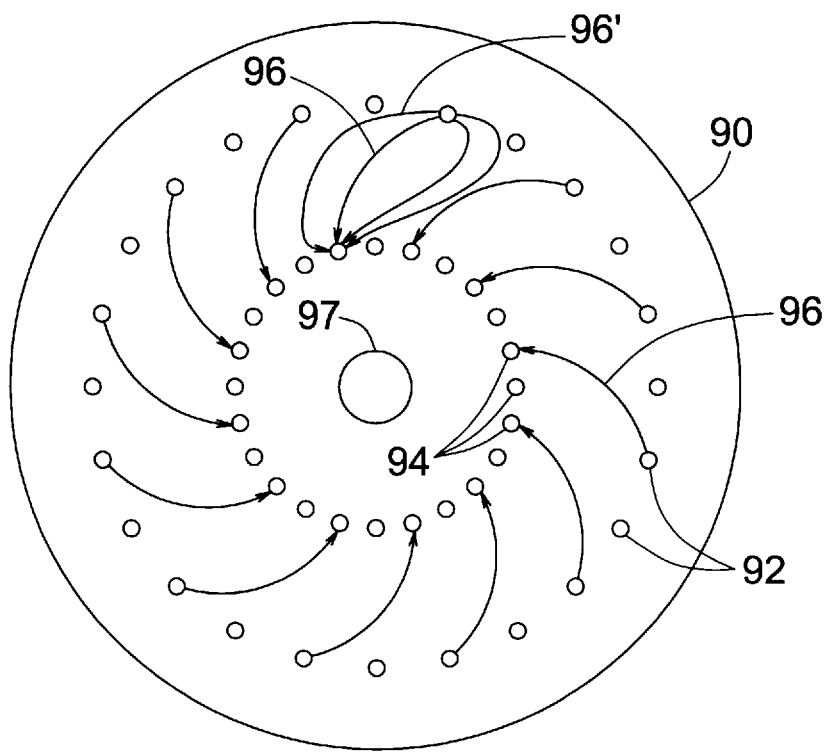
FIG. 10 is a top plan view of a heat exchanger plate constructed for positioning above or below the heat exchanger plate of FIG. 8 diagrammatically showing the flow channels which are formed therein and provide a radially inward involute flow pattern.

Two of the platelets, which form recuperator 14, are shown in FIGS. 9 and 10 and designated with reference numeral 90. Platelets 90 preferably are ultrathin sheets of metal, e.g., stainless steel, and preferably have a thickness in a range of about 0.002 to 0.020 inches and a diameter of about 0.5 to 1 meter depending on the required engine size.

In the preferred embodiment, each platelet is provided with a plurality of circumferentially spaced outer holes 92

(e.g., 40 in number) and preferably an equal number of inner circumferentially spaced holes 94. Each platelet also includes radial channels or grooves which are diagrammatically represented according to their general configuration with arrows 96 in FIGS. 9 and 10. Channels or grooves 96 are formed in the upper surface of each platelet and extend between and fluidly couple alternate pairs of circumferentially spaced holes as shown in the drawings. The arrows show the flow direction of alternate grooves or groove groups as will be described in more detail below. The grooves preferably are rectangular in cross-section and have a width of about 20 to 90 mils and a depth of about 5 to 20 mils. Each platelet also includes a center hole 97 for forming a central passageway in the recuperator when the platelets are stacked. A poison rod 88 is slidably mounted in that central passageway (FIG. 1) so that it can be inserted into the center hole of the reactor vessel to arrest the reactor in case of emergency. The holes that form passageways 32 are not shown in FIGS. 8 and 9 for purposes of simplification. However, it is noted that since control drum shafts 36 essentially fill passageways 32 and the center hole is filled with poison rod 88, the overall density of the heat exchanger is substantially uniform.

In stacking platelets 90, the platelets are arranged so that holes 92 and 94 in adjacent platelets are substantially aligned to form a multitude of passages that are generally perpendicular to channels 96 and extend through the thickness of the recuperator. In the preferred embodiment, the platelets are clocked in one direction, either clockwise or counterclockwise. That is, before the platelets are fixed in position, adjacent platelets are rotated relative to one another by about ½ to 3°, for example, so that holes 92 and 94 in one platelet are slightly offset from holes 92 and 94 in an adjacent platelet, but are still fluidly coupled therewith. For example, a platelet oriented as shown in FIG. 9 is stacked above or below a platelet oriented as shown in FIG. 10 and the platelets rotated so that holes 92 and 94 in one platelet are offset from, but overlap corresponding holes 92 and 94 in the other platelet. This platelet orientation is continued throughout the stack so that a passage is formed by each set of overlapping holes. In this manner, each axial passage extends in a clockwise or counterclockwise direction as it extends through the thickness of the stack. The resultant construction has a multitude of generally parallel, spiral, circumferentially and axially extending passages. The axial extension of a number of these passages is diagrammatically shown in FIG. 8 and indicated with reference characters 92A, 92B, 94A and 94B. As discussed above, adjacent platelets are generally oriented as shown in FIGS. 9 and 10. The holes in FIG. 9 which are interconnected by channels 96 are coupled to a first fluid line, while the holes in FIG. 10 which are interconnected by channels 96 are coupled to a second fluid line. In this manner, desirable counterflow between adjacent platelets can be achieved as one platelet can provide flow in the radially outward direction and the platelet adjacent thereto can provide flow in the radially inward direction as will be described in more detail below. The outermost plates (preferably several of these plates at each end) are not provided with radial channels, to provide fluid boundaries and structural integrity of the fluid passages.

The foregoing arrangement of passages and channels provides a substantially uniform density of the mass that forms the recuperator, and, thus improves gamma shielding efficiency. However, it should be understood that although the generally radially extending channels and generally axially extending passages are arranged so that the central portion of the heat exchanger has an essentially uniform density for effective gamma shielding, it is somewhat less dense than the remainder of the heat exchanger (i.e., the portion that extends radially outward from the outermost generally axial passages) as would be apparent from the foregoing description. However, when the center hole and axial passageways are filled with the poison rod and control drum shafts 36, respectively, the overall density of the heat exchanger still is substantially uniform due to the relatively small size of the channels and accompanying passages, for example, so that gamma rays are uniformly attenuated and low density regions that would allow strong gamma ray penetration are eliminated.

To further enhance the uniform density of the recuperator, the channels are configured to provide an essentially constant width between adjacent radially extending channels. In the preferred embodiment, the channels are configured as involute spirals. The width of each flow channel also can be increased in the radially outward direction to further maintain an essentially constant width between adjacent channels. In a further preferred embodiment, a group of channels can fluidly couple each pair of alternating openings 92 and 94. Although each channel 96 is replaced by a group of channels 96', only one such group of channels is diagrammatically shown in FIG. 10 and designated with reference numeral 96' for simplification. The group of channel 96' can include channel 96, as shown in the drawings as indicated by the dashed reference numeral in FIG. 10. This configuration further enhances the uniformity of the recuperator mass density and counterflow between adjacent plates in the vertical direction.

Figure 7:
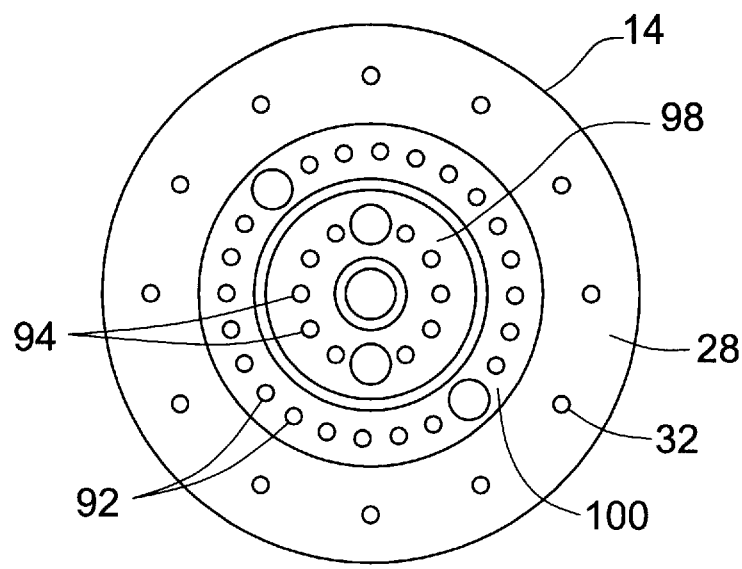
FIG. 7 is a top view of the heat exchanger of FIG. 1.
Figure 8:
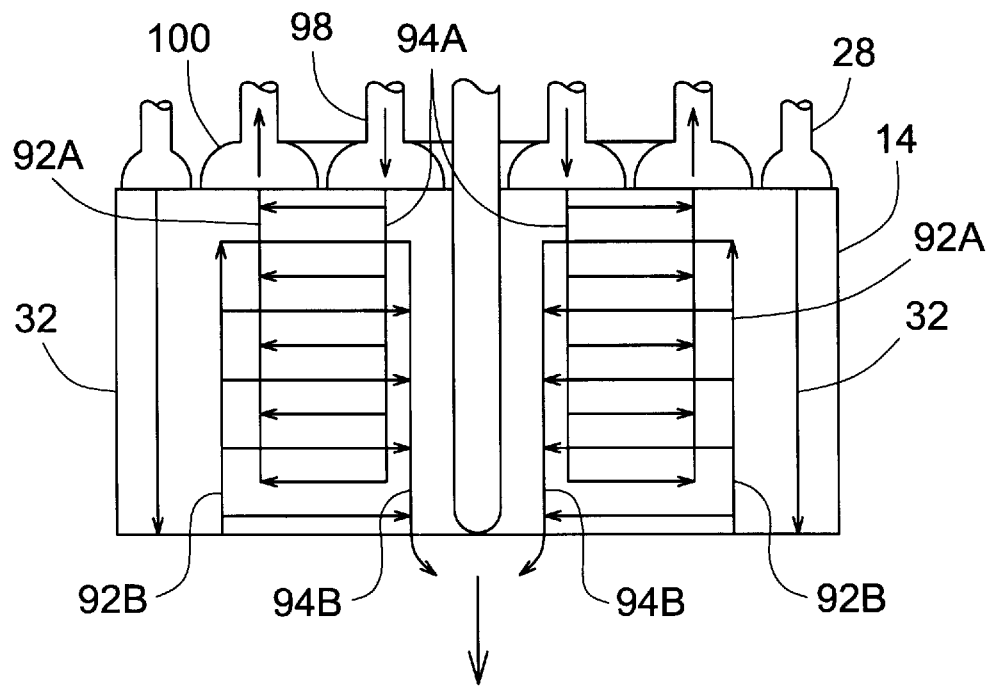
FIG. 8 is a diagrammatic representation of the flow pattern of the heat exchanger of FIG. 1.

Referring to FIG. 8, the flow pattern is diagrammatically shown. A multitude of radially extending generally involute, spiral channels interconnect outer and inner axial passages 92A & 94A and 92B & 94B. More specifically, liquid propellant is introduced through manifold 98 to inner holes or passageways 94 (FIG. 7). The propellant flows both downwardly through outer passageways 94A (formed by alternating platelet holes 94) and radially outward along channels or grooves 96 to passageways 92A (formed by alternating platelet holes 92) from which the gaseous propellant then exits the heat exchanger via manifold 100 and is delivered to the turbine. The turbine exhaust is routed to manifolds 28 from where it is circulated through the reflector assembly and reactor core and reintroduced via channel 40 in strut 30 to the inlet of axial passages 92B in the recuperator. From there it flows upwardly through passages 92B and radially inward along grooves 96 to inner passages 94B from which it is discharged to neutron shielding member 106 before flowing through the fuel assemblies.

Referring to FIGS. 1 and 2, the central inner wall of reactor vessel 46 extends upwardly toward recuperator 14 to provide a passage for propellant discharged from the recuperator to lower plenum 64 before entering the fuel assemblies. This inner wall vessel extension 108 is tubular and includes an enlarged generally disc-shaped portion 110 which preferably contains neutron shielding member 106. Neutron shielding member 106 preferably comprises stacked plates comprising metallic hydride. Zirconium hydride and lithium hydride are examples of suitable materials. The plates are provided with a dense configuration of radially extending channels interconnected by axially arranged holes, which can be provided as described above with respect to recuperator 14, but with a single fluid circuit as opposed to the recuperator twin fluid circuit described above, to allow the gaseous hydrogen propellant to flow throughout member 106 and shield the recuperator and vehicle from neutron bombardment.

Figure 11:
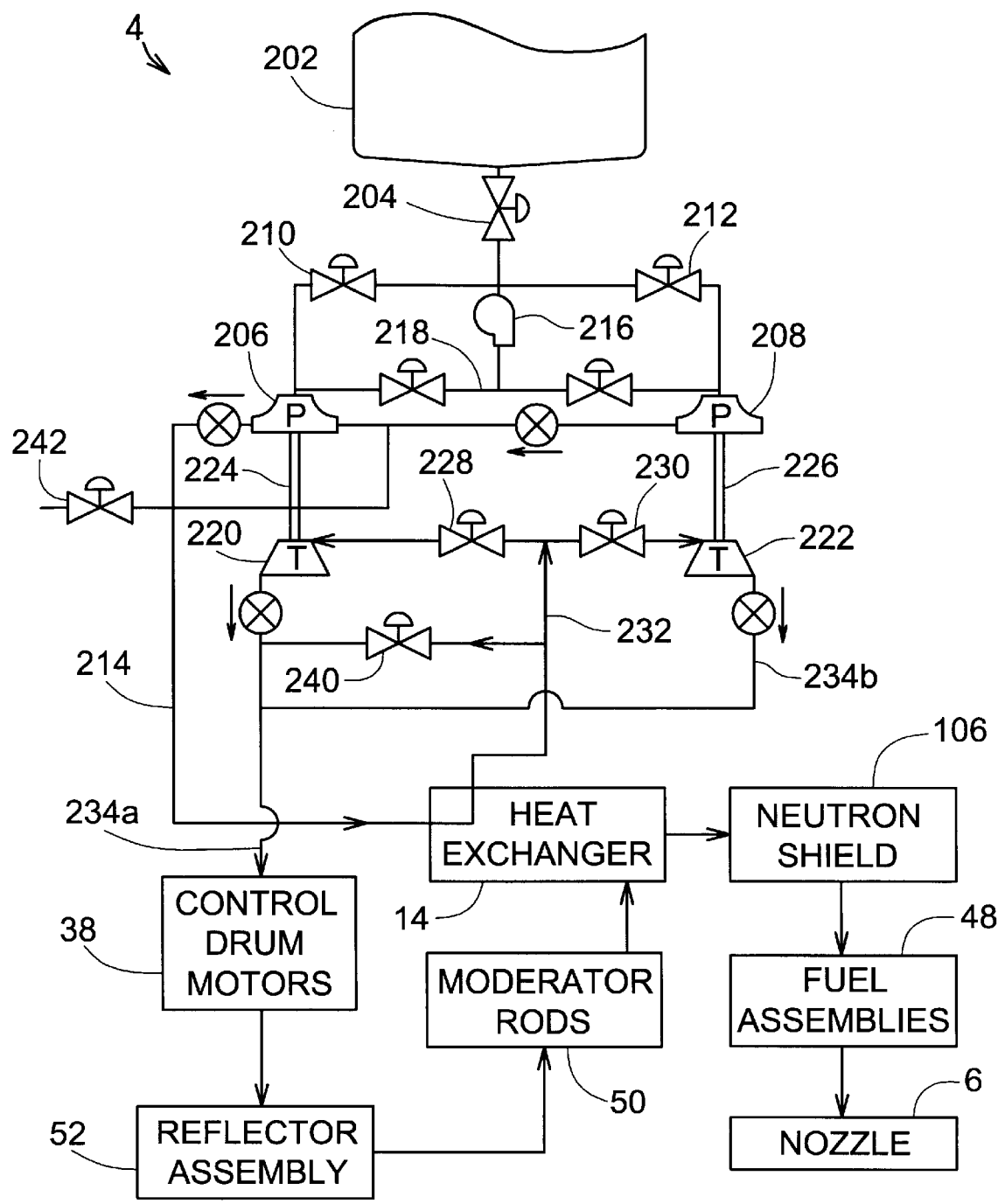
FIG. 11 is a diagrammatic representation of a nuclear thermal rocket engine showing the nozzle assembly of FIG. 1 coupled to a primary feed system in accordance to the present invention.

Referring to FIG. 11, the primary feed system will be described in detail. Primary feed system 4 is a "topping power cycle" in which excess reactor heat is used to run feed system 4. The liquid hydrogen is stored in a main tank 202 located within the rocket upstream of feed system 4. A tank valve 204 coupled to main tank 202 can be opened to allow the liquid hydrogen to enter feed system 4. Two turbopumps 206, 208 coupled to tank valve 204 function to draw the hydrogen from main tank 202, pressurize it and then pump the high pressure hydrogen through feed system 4. Pump inlet valves 210, 212 are disposed between tank valve 204 and pumps 206, 208 to control the flow of the hydrogen through either one of the pumps 206, 208. Pumps 206, 208 are fluidly connected to heat exchanger 14 by a primary feed line 214.

To help start pumps 206, 208, an electric pump 216 is positioned along an alternative flow path 218 between main tank 202 and pumps 206, 208. Electric pump 216 initially draws hydrogen from main tank 202 to start the flow of hydrogen through pumps 206, 208. Once pumps 206, 208 begin running, electric pump 216 is turned off and the hydrogen flows through valves 210, 212. Electric pump 216 can also be used as a back-up pump if a mechanical problem occurs or for low thrust operation during flight.

Two turbines 220, 222 are coupled to pumps 206, 208 by rotating shafts 224, 226. Turbines 220, 222 rotate shafts 224, 226 and drive pumps 206, 208 when heated hydrogen enters the turbines through turbine inlet valves 228, 230. Turbine inlet valves 228, 230 are fluidly connected to heat exchanger 14 by a turbine inlet flow path 232. The outlets of turbines 220, 222 are fluidly connected to control drum motors 38 and reflector assembly 52 by lines or paths 234a,b.

The liquid hydrogen is pumped through primary feed line 214 and into heat exchanger 14 where it is heated and gasified by hydrogen entering the heat exchanger from the reactor core (discussed below). The heated hydrogen then flows along turbine inlet path 232 through turbine inlet valves 228, 230 and drives turbines 220, 222. After driving turbines 220, 222, the hydrogen is exhausted and passes through turbine outlet paths 234a,b into control drum manifold 28 via inlets 29 and cools control drum motors 38 as it flows around the motors. From there it is circulated through strut channels 34 and reflector assemblies 52 from which it is discharged to lower reactor plenum 57 (FIGS. 1 and 6). Then the hydrogen passes through lower reactor support plate holes 59, between moderator rods 50, through upper reactor support plate holes 59 (FIG. 5) and into upper reactor plenum 55 before returning to recuperator or heat exchanger 14 via strut channels 40. The hydrogen passes through the heat exchanger and is discharged into neutron shield 106 as discussed above. Reflector assembly 52 and moderator rods 50 and neutron shield 106 transfer excess reactor heat (created as a byproduct of fuel fissions) to the hydrogen. Although the hydrogen was initially heated in heat exchanger 14, its temperature is sufficiently lowered in the turbines to receive the excess reactor heat and thereby cool reflector assembly 52 and moderator rods 50.

Before being discharged from the heat exchanger to neutron shield 106, the hydrogen cools to a relatively low temperature as it transfers most of its heat to the liquid hydrogen coming from primary feed line 214 (discussed above). The relatively cool hydrogen is then directed through neutron shield 106 to bottom plenum 64, through vessel holes 62 and bellows members 60 and into fuel assemblies 48, where it is heated to the full outlet temperature, and propelled through nozzle 6. Nozzle 6 is preferably a convergent-divergent nozzle that accelerates the hydrogen to mach 1.0 at the throat. The hydrogen is then expanded and accelerated beyond mach 1.0 into space to provide thrust for the rocket.

A control valve 240 is positioned between turbine inlet path 232 and turbine outlet path 234 and a chilldown valve 242 is positioned along primary feed line 214. Control valve 240 can be opened to allow the heated hydrogen exiting heat exchanger 14 to bypass turbines 220, 222 and directly enter cooling manifold 28 via inlets 29 to cool control drum motors 38 before entering strut channels 34. This reduces the turbine power and feed system hydrogen flow. Chilldown valve 242 can be opened to bleed a portion of the liquid hydrogen exiting pumps 206, 208 for cooling the pumps before operating them.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A nuclear rocket engine comprising:

a rocket propellant source;

a nuclear reactor for heating propellant from the rocket propellant source, the reactor having first and second inlets and first and second outlets, the first inlet fluidly being coupled to the first outlet, the second inlet fluidly being coupled to the second outlet and the first outlet being coupled to the second inlet to form a closed fluid passage from the propellant source to the second outlet; and a heat exchanger positioned between the rocket propellant source and the nuclear reactor, the heat exchanger defining a first group of passages coupled to the rocket propellant source and the first nuclear reactor inlet and a second group of passages coupled to the second nuclear reactor inlet and the first nuclear reactor outlet, the first and second group of passages being in thermal communication with each other for transferring heat between fluid flowing through the first group of passages and fluid flowing through the second group of passages.

2. The rocket engine of claim 1 wherein the second group of passages are spaced radially outward from the first group of passages.

3. The rocket engine of claim 2 wherein the heat exchanger comprises a block having a longitudinal axis and multiple groups of channels extending substantially perpendicular to and fluidly coupling the first and second group of passages for radial flow therebetween.

4. The rocket engine of claim 3 wherein the channel groups are substantially uniformly spaced from one another along the longitudinal axis of the block.

5. The rocket engine of claim 3 wherein the channels and passages are structured and arranged so that the portion of the heat exchanger having channels and passages has an essentially uniform density.

6. The rocket engine of claim 3 wherein each channel forms an involute spiral segment, the involute spiral segments being disposed at substantially constant distances between adjacent segments in a circumferential direction.

7. The rocket engine of claim 3 wherein the block has a generally circular configuration.

8. The rocket engine of claim 1 wherein the heat exchanger comprises a gamma shield for inhibiting gamma radiation generated by the nuclear rocket from passing through the gamma shield.

9. The rocket engine of claim 1 wherein the heat exchanger comprises a material selected to attenuate gamma radiation.

10. The rocket engine of claim 1 wherein the heat exchanger comprises a nickel alloy.

11. A nuclear rocket engine comprising:

a rocket propellant source;

a nuclear reactor for heating propellant from the rocket propellant source, the reactor having an inlet and an outlet; and a heat exchanger positioned between the rocket propellant source and the nuclear reactor, the heat exchanger defining a first group of passages coupled to the rocket propellant source and the nuclear reactor inlet and a second group of passages coupled to the nuclear reactor outlet, the first and second group of passages being in thermal communication with each other for transferring heat between fluid flowing through the first group of passages and fluid flowing through the second group of passages;

wherein the heat exchanger comprises a plurality of platelets, each platelet having a first group of circumferentially spaced holes, a second group of circumferentially spaced holes that are positioned radially outward from the first group of holes and radial channels fluidly coupling holes from the first group with holes from the second group, the platelets being stacked together such that the holes are aligned to form multiple passages extending transversely relative to each plate-like member.

12. A nuclear rocket engine comprising:

a rocket propellant source;

a nuclear reactor for heating propellant from the rocket propellant source, the nuclear reactor including a first inlet for receiving said propellant, an outlet fluidly coupled to the first inlet for discharging heated propellant and a second inlet;

a feed system including a first line coupling the rocket propellant source to the first inlet and a second line coupling the outlet with the second inlet; and a heat exchanger positioned along the first and second lines for transferring heat from heated propellant flowing through the second line to propellant flowing through the first line.

13. The rocket engine of claim 12 wherein the feed system further comprises a pump coupled to the second line for pumping the propellant through the first line and a turbine coupled to the second line and to the pump for driving the pump, wherein the heated propellant flowing through the second line at least partially drives the turbine.

14. The rocket engine of claim 12 wherein the nuclear reactor further comprises a nuclear reactor core including multiple fuel assemblies and a second outlet, the fuel assemblies coupling the second inlet with the second outlet.

15. The rocket engine of claim 14 wherein the nuclear reactor further comprises a reflector assembly surrounding the core, the reflector assembly including multiple passages coupling the first inlet with the outlet, the reflector assembly transferring heat to rocket propellant passing through the multiple passages.

* * * * *